US012767820B2

(12) United States Patent
Wang et al.

(10) Patent No.: US 12,767,820 B2
(45) Date of Patent: Oct. 20, 2026

(54) THERMOPLASTIC COMPOSITIONS INCLUDING RECYCLED POLYCARBONATE WITH IMPROVED HYDRO-AGING PERFORMANCE

(71) Applicant: SHPP GLOBAL TECHNOLOGIES B.V., Bergen op Zoom (NL)

(72) Inventors: Qin Wang, Shanghai (CN); Jian Yang, Shanghai (CN)

(73) Assignee: SHPP Global Technologies B.V., Bergen op Zoom (NL)

( * ) Notice: Subject to any disclaimer, the term of this patent is extended or adjusted under 35 U.S.C. 154(b) by 439 days.

(21) Appl. No.: 18/016,935

(22) PCT Filed: Jul. 21, 2021

(86) PCT No.: PCT/IB2021/056603
§ 371 (c)(1),
(2) Date: Jan. 19, 2023

(87) PCT Pub. No.: WO2022/018666
PCT Pub. Date: Jan. 27, 2022

(65) Prior Publication Data

US 2023/0348713 A1 Nov. 2, 2023

(30) Foreign Application Priority Data

Jul. 24, 2020 (EP) .................................... 20187597
Feb. 2, 2021 (EP) .................................... 21154811

(51) Int. Cl.
*C08L 69/00* (2006.01)
*C08K 3/32* (2006.01)

(52) U.S. Cl.
CPC ................ *C08L 69/00* (2013.01); *C08K 3/32* (2013.01); *C08K 2003/328* (2013.01); (Continued)

(58) Field of Classification Search
CPC combination set(s) only.
See application file for complete search history.

(56) References Cited

U.S. PATENT DOCUMENTS 5,354,791 A 10/1994 Gallucci
5,606,007 A * 2/1997 Sakashita ................ C08K 3/32 528/202

(Continued)

FOREIGN PATENT DOCUMENTS

EP 3640954 A1 4/2020
EP 3683271 A1 7/2020

(Continued)

OTHER PUBLICATIONS

International Search Report and Written Opinion mailed Sep. 28, 2021 in PCT/IB2021/056603 (10 pgs.).

*Primary Examiner* — Randy P Gulakowski
*Assistant Examiner* — Audra J Destefano
(74) *Attorney, Agent, or Firm* — Quicker Law, LLC

(57) ABSTRACT

Thermoplastic compositions include: (a) from about 5 wt % to about 95 wt % of at least one recycled polycarbonate comprising a post-consumer recycled (PCR) polycarbonate; and (b) from about 0.01 wt % to about 2 wt % of an acid component. The post-consumer recycled (PCR) polycarbonate comprises at least 10 mol % —OH endgroup content. In certain aspects the acid component includes mono zinc phosphate (MZP), a liquid solution comprising phosphorous acid, or a combination thereof. The compositions have improved hydro-aging properties as compared to conventional compositions that include recycled polycarbonate.

11 Claims, 6 Drawing Sheets

(Reference Rank 4)

(52) U.S. Cl.
CPC ....... *C08L 2203/20* (2013.01); *C08L 2205/03* (2013.01); *C08L 2207/20* (2013.01)

(56) References Cited

U.S. PATENT DOCUMENTS

| | | | |
|---|---|---|---|
| 2002/0115792 A1 | 8/2002 | Verhoogt et al. | |
| 2005/0113534 A1 | 5/2005 | Agarwal et al. | |
| 2011/0245388 A1* | 10/2011 | Monden ................. | C08K 5/549 525/464 |
| 2013/0190425 A1 | 7/2013 | Zhu et al. | |
| 2013/0313493 A1* | 11/2013 | Wen ...................... | C08L 69/005 252/601 |
| 2015/0080515 A1 | 3/2015 | Daga et al. | |

FOREIGN PATENT DOCUMENTS

| | | | | |
|---|---|---|---|---|
| EP | 3712209 A1 | 9/2020 | | |
| WO | 2012/129276 A1 | 9/2012 | | |
| WO | 2017/216678 A1 | 12/2017 | | |
| WO | WO-2021126796 A1 * | 6/2021 | .............. | C08L 69/00 |

* cited by examiner (Reference Rank 1)

(Reference Rank 2)

(Reference Rank 3)

(Reference Rank 4)

(Reference Rank 5)

THERMOPLASTIC COMPOSITIONS INCLUDING RECYCLED POLYCARBONATE WITH IMPROVED HYDRO-AGING PERFORMANCE

CROSS-REFERENCE TO RELATED APPLICATIONS

This application is the National Stage of International Application No. PCT/IB2021/056603 filed Jul. 21, 2021, which claims priority to and the benefit of European Application No. 20187597.8 filed Jul. 24, 2020 and European Application No. 21154811.0 filed Feb. 2, 2021, the disclosures of which are incorporated herein by this reference in their entireties.

FIELD OF THE DISCLOSURE

The present disclosure relates to thermoplastic compositions including recycled polycarbonate (PC) that have improved hydro-aging performance.

BACKGROUND OF THE DISCLOSURE

The consumer electronics market is looking for more sustainable (i.e., a "greener") footprint in its products. The use of recycled plastics—such as post-consumer recycled (PCR) plastics—provides one straightforward solution in this market. Demands for PCR plastic are increasing due at least on part to regulations such as US Federal Acquisition Regulations (FAR) which incorporate use of the Electronic Product Environmental Assessment Tool (EPEAT). Unfortunately, almost all available PCR products are black or dark in color, which limits their desirability in certain applications that require white or bright colors. This color limitation results from the source of PCR resins (such as PCR-polycarbonate (PC)), which are recycled from water bottles which have a dark blue color.

Recently, consumer electronics (CE) customers are requesting colorable requirements in the products. Sources of lighter-colored PCR-PC include, but are not limited to, automobile lights, PC sheets and discs (e.g., CD-Roms, DVDs, etc.). Such PCR-PC sources have comparable color properties (e.g., L, a, b values) as virgin PC. Unfortunately, however, it has been found that clear PCR-PC has hydro-aging issues, as evidenced by spots/flecks in the clear samples. Examples of hydro-aging failures are shown in FIGS. 1A and 1B. Hydro-aging problems will induce long-term usage failure risk on products including such components, especially for unfilled PC components. Thus, product developers need to find way to address the hydro-aging problem.

These and other shortcomings are addressed by aspects of the present disclosure.

SUMMARY

Aspects of the disclosure relate to thermoplastic compositions including: (a) from about 5 wt % to about 95 wt % of at least one recycled polycarbonate including a post-consumer recycled (PCR) polycarbonate; and (b) from about 0.01 wt % to about 2 wt % of an acid component. The post-consumer recycled (PCR) polycarbonate includes at least 10 mol % —OH endgroup content. In certain aspects the acid component includes mono zinc phosphate (MZP), a liquid solution comprising phosphorous acid, or a combination thereof. The compositions have improved hydro-aging properties as compared to conventional compositions that include recycled polycarbonate.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

DETAILED DESCRIPTION

Figure 1B:
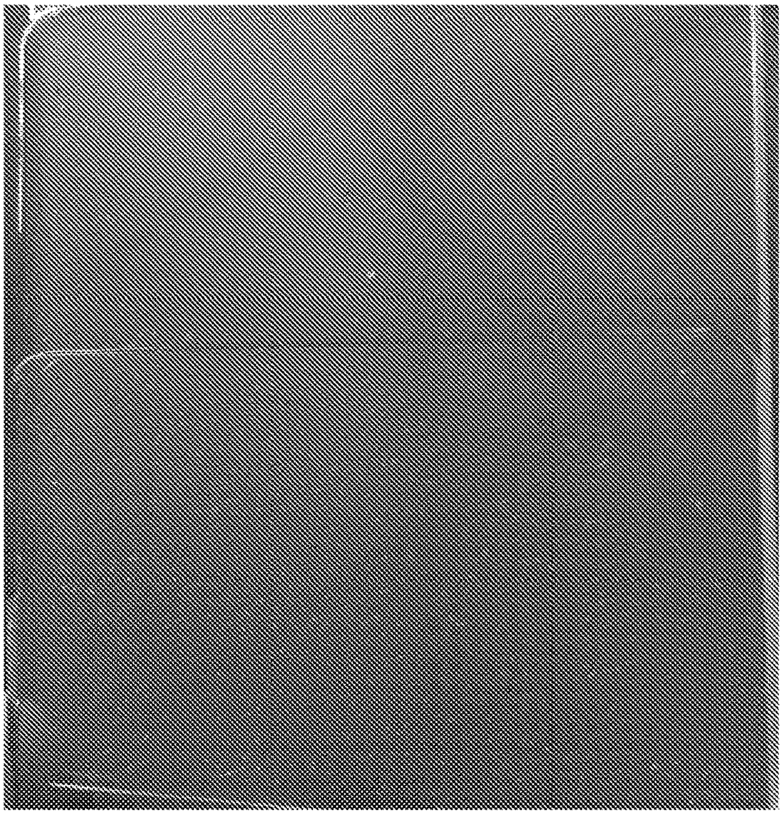
FIG. 1B (Prior Art)
FIGS. 1A and 1B are photographs showing samples of conventional PCR-PC compositions having poor hydro-aging stability.
Figure 1A:
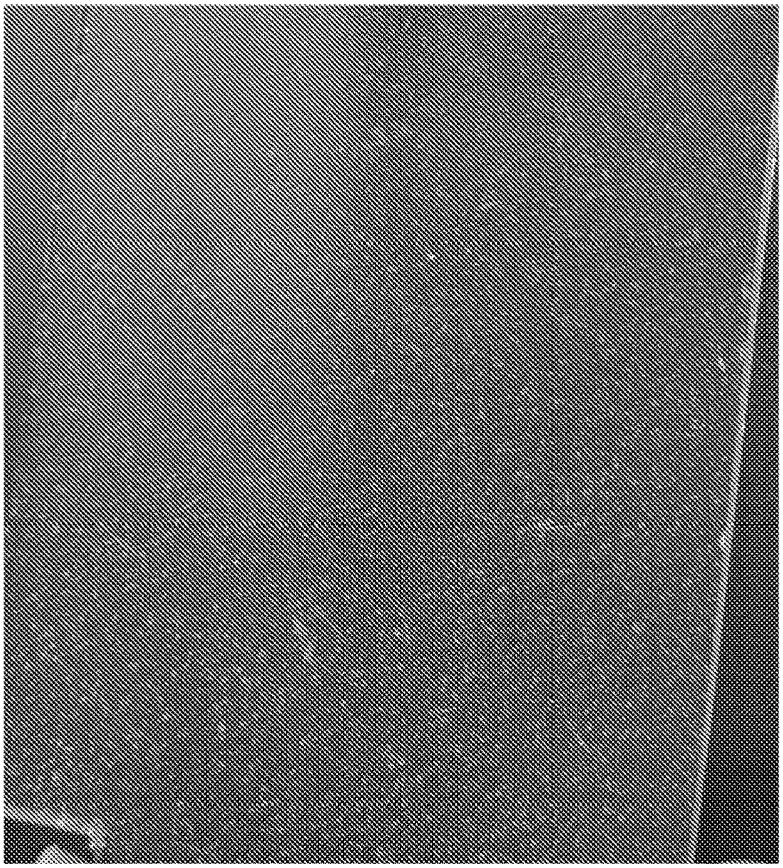
FIG. 1A (Prior Art)

After evaluating the polycarbonate recycling process, and in particular washing steps which utilize an alkali soak to remove coatings and the use of vitriol as a neutralizer, various additives were included in recycled PC formulations to attempt to address hydro-aging performance issues. In the present disclosure it is found that by including certain quenchers and/or chain extenders—either alone or in combination—the hydro-aging issue can be well improved, allowing for colorable recycled PC products to meet cosmetic and other demands of CE consumers.

The present disclosure can be understood more readily by reference to the following detailed description of the disclosure and the Examples included therein. In various aspects, the present disclosure pertains to thermoplastic compositions including: (a) from about 5 wt % to about 95 wt % of at least one recycled polycarbonate including a post-consumer recycled (PCR) polycarbonate; and (b) from about 0.01 wt % to about 2 wt % of an acid component. The post-consumer recycled (PCR) polycarbonate includes at least 10 mol % —OH endgroup content. In certain aspects the acid component includes mono zinc phosphate (MZP), a liquid solution comprising phosphorous acid, or a combination thereof. The compositions have improved hydro-aging properties as compared to conventional compositions that include recycled polycarbonate.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an acid component" includes mixtures of two or more acid components.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B—F, C-D, C-E, and C—F are considered disclosed. Likewise, any subset or combination of these is also disclosed. Thus, for example, the sub-group of A-E, B—F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The terms "BisA," "BPA," or "bisphenol A," which can be used interchangeably, as used herein refers to a compound having a structure represented by the formula:

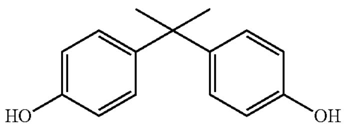 [SMILES: CC(C)(c1ccc(O)cc1)c1ccc(O)cc1]

BisA can also be referred to by the name 4,4'-(propane-2, 2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Aspects of the disclosure relate to: (a) from about 5 wt % to about 95 wt % of at least one recycled polycarbonate (PC); and (b) from about 0.01 wt % to about 2 wt % of an acid component. The at least one recycled PC includes a post-consumer recycled (PCR) polycarbonate. The PCR polycarbonate comprises at least 10 mol % —OH endgroup content. The —OH endgroup content may be determined according to conventional methods known to those skilled in the art.

The combined weight percent value of all components does not exceed 100 wt %, and all weight percent values are based on the total weight of the composite.

As noted the at least one recycled PC includes a post-consumer recycled (PCR) polycarbonate. A recycled (e.g., PCR) polycarbonate can be distinguished from a virgin polycarbonate by the inclusion of at least 10 mol % —OH endgroup content in the polycarbonate. In some aspects the PCR polycarbonate includes from 10 mol % to 35 mol % —OH endgroup content in the polycarbonate. The recycled PC may be clear or colored. Clear recycled PC may be sourced from, for example, water bottles, recycled PC sheets, automobile headlights, and optical discs (e.g., one or more of compact discs (CDs), digital versatile discs (DVDs) and Blue-ray discs). One exemplary source for colored PC is water bottles.

In certain aspects the composition further includes from greater than 0 wt % to about 90 wt % of a non-recycled PC component. Examples of non-recycled PC include virgin PC, a PC homopolymer, a PC copolymer, and combinations thereof. Virgin PC and other PC products are available from SABIC.

In particular aspects the composition further includes a polycarbonate-siloxane (PC—Si) copolymer. The PC—Si copolymer may in some aspects have a siloxane content of from about 5 wt % to about 35 wt %. In other aspects the PC—Si copolymer has a siloxane content of from about 10-30 wt %, or from about 15 wt % to about 25 wt %, or about 20 wt %. Exemplary PC—Si copolymers include SABIC EXL copolymers.

The acid component may include in some aspects mono zinc phosphate (MZP), a liquid solution including phosphorous acid, or a combination thereof.

In further aspects the composition includes from greater than 0 wt % to about 5 wt % of an epoxy stabilizer. An exemplary epoxy stabilizer includes, but is not limited to, an epoxy chain extender such as Joncryl ADR 4368CS, available from BASF.

In yet further aspects the composition includes from greater than 0 wt % to about 5 wt % of at least one additional stabilizer. The additional stabilizer may include, but is not limited to, a UV stabilizer or a thermal stabilizer.

In particular aspects the composition includes both mono zinc phosphate as the acid component and an epoxy stabilizer. In other aspects the composition includes a liquid solution including phosphorous acid as the acid component but does not include an epoxy stabilizer.

Properties of Thermoplastic Compositions

Thermoplastic compositions according to aspects of the disclosure have improved hydro-aging stability after exposure for 3 days at 85° C. and 85% relative humidity (RH) as compared to a comparative composition that does not include the acid component. Improved hydro-aging stability may be visually observed according to methods described herein, and may be characterized by at least one rank improvement as compared to the comparative composition that does not include the acid component.

In some aspects the compositions include mono zinc phosphate and an epoxy stabilizer and has an improved L* color value, as tested in accordance with ASTM 2244 with a 10 degree (°) observer and a D65 illuminant, as compared to a comparative composition that does not include the epoxy stabilizer. In certain aspects the L* color value is improved by at least 3%, or at least 4%, or at least 5%, or at least 6%, or at least 7%, or at least 8%, or at least 9%, or at least 10%, or up to 15%, or up to 20%, or from 3-20%, or from 3-15%, or from 3-10%, as compared to a comparative composition that does not include the epoxy stabilizer.

In further aspects composition includes mono zinc phosphate and an epoxy stabilizer and has an improved transmittance, as tested in accordance with ASTM D1003, as compared to a comparative composition that does not include the epoxy stabilizer. In particular aspects the transmittance is improved by at least 10%, or at least 15%, or at least 20%, or at least 30%, or at least 35%, or at least 40%, or up to 50%, or from 10-50%, or from 10-40%, or from 10-35%, as compared to a comparative composition that does not include the epoxy stabilizer.

In some aspects the composition includes mono zinc phosphate and an epoxy stabilizer and has a reduced yellowness index (YI), as tested in accordance with ASTM D2244, as compared to a comparative composition that does not include the epoxy stabilizer. In other aspects the YI is reduced by at least 10%, or at least 15%, or at least 20%, or at least 25%, or at least 30%, or at least 35%, or at least 40%, or at least 45%, or at least 50%, or up to 60%, or up to 75%, or from 10-75%, or from 10-60%, or from 15-75%, or from 15-60%, as compared to a comparative composition that does not include the epoxy stabilizer.

Methods of Manufacture

The one or any foregoing components described herein may be first dry blended with each other, or dry blended with any combination of foregoing components, then fed into an extruder from one or multi-feeders, or separately fed into an extruder from one or multi-feeders. Fillers used in the compositions, if included, may also be first processed into a masterbatch, then fed into an extruder. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations including at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations including at least one of the foregoing forces or forms of energy.

The barrel temperature on the extruder during compounding can be set at the temperature where at least a portion of the polymer has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

Articles of Manufacture

In certain aspects, the present disclosure pertains to shaped, formed, or molded articles including the thermoplastic compositions. The thermoplastic compositions can be molded into useful shaped articles by a variety of means such as injection molding, extrusion, rotational molding, blow molding and thermoforming to form articles and structural components of, for example, personal or commercial electronics devices, including but not limited to cellular telephones, tablet computers, personal computers, notebook and portable computers, and other such equipment, medical applications, RFID applications, automotive applications, and the like. In a further aspect, the article is extrusion molded. In a still further aspect, the article is injection molded.

Various combinations of elements of this disclosure are encompassed by this disclosure, e.g., combinations of elements from dependent claims that depend upon the same independent claim.

ASPECTS OF THE DISCLOSURE

In various aspects, the present disclosure pertains to and includes at least the following aspects.

Aspect 1. A thermoplastic composition comprising, consisting of, or consisting essentially of:

(a) from about 5 wt % to about 95 wt % of at least one recycled polycarbonate; and (b) from about 0.01 wt % to about 2 wt % of an acid component, wherein the combined weight percent value of all components does not exceed 100 wt %, and all weight percent values are based on the total weight of the composite.

Aspect 2. The thermoplastic composition according to Aspect 1, wherein the at least one recycled polycarbonate comprises a post-consumer recycled (PCR) polycarbonate.

Aspect 3. The thermoplastic composition according to Aspect 2, wherein the PCR polycarbonate is clear or colored.

Aspect 4. The thermoplastic composition according to any of Aspects 1 to 3, wherein the composition further comprises from greater than 0 wt % to about 90 wt % of a non-recycled polycarbonate component.

Aspect 5. The thermoplastic composition according to Aspect 4, wherein the non-recycled polycarbonate component comprises virgin polycarbonate, a polycarbonate homopolymer, a polycarbonate copolymer, or a combination thereof.

Aspect 6. The thermoplastic composition according to any of Aspects 1 to 5, wherein the composition further comprises a polycarbonate-siloxane copolymer.

Aspect 7. The thermoplastic composition according to Aspect 6, wherein the polycarbonate-siloxane copolymer has a siloxane content of from about 15 wt % to about 25 wt %.

Aspect 8. The thermoplastic composition according to any of Aspects 1 to 7, wherein the acid component comprises mono zinc phosphate (MZP), a liquid solution comprising phosphorous acid, or a combination thereof.

Aspect 9. The thermoplastic composition according to any of Aspects 1 to 8, wherein the composition further comprises from greater than 0 wt % to about 5 wt % of an epoxy stabilizer.

Aspect 10. The thermoplastic composition according to any of Aspects 1 to 9, wherein the composition further comprises from greater than 0 wt % to about 5 wt % of at least one additional stabilizer.

Aspect 11. The thermoplastic composition according to Aspect 10, wherein the at least one additional stabilizer comprises a UV stabilizer or a thermal stabilizer.

Aspect 12. The thermoplastic composition according to any of Aspects 1 to 11, wherein the composition comprises mono zinc phosphate and an epoxy stabilizer.

Aspect 13. The thermoplastic composition according to any of Aspects 1 to 12, wherein the composition has improved hydro-aging stability after exposure for 3 days at 85° C. and 85% relative humidity (RH) as compared to a comparative composition that does not comprise the acid component.

Aspect 14. The thermoplastic composition according to any of Aspects 1 to 13, wherein the composition comprises mono zinc phosphate and an epoxy stabilizer and has an improved L* color value, as tested in accordance with ASTM 2244 with a 10 degree (°) observer and a D65 illuminant, as compared to a comparative composition that does not comprise the epoxy stabilizer.

Aspect 15. The thermoplastic composition according to any of Aspects 1 to 14, wherein the composition comprises mono zinc phosphate and an epoxy stabilizer and has an improved transmittance, as tested in accordance with ASTM D1003, as compared to a comparative composition that does not comprise the epoxy stabilizer.

Aspect 16. The thermoplastic composition according to any of Aspects 1 to 15, wherein the composition comprises mono zinc phosphate and an epoxy stabilizer and has a reduced yellowness index, as tested in accordance with ASTM D2244, as compared to a comparative composition that does not comprise the epoxy stabilizer.

Aspect 17. A thermoplastic composition comprising, consisting of, or consisting essentially of:

(a) from about 5 wt % to about 95 wt % of at least one recycled polycarbonate comprising a post-consumer recycled (PCR) polycarbonate; and (b) from about 0.01 wt % to about 2 wt % of an acid component, wherein the PCR polycarbonate comprises at least 10 mol % —OH endgroup content, and wherein the combined weight percent value of all components does not exceed 100 wt %, and all weight percent values are based on the total weight of the composite.

Aspect 18. The thermoplastic composition according to Aspect 17, wherein the PCR polycarbonate comprises from 10 mol % to 35 mol % —OH endgroup content.

Aspect 19. The thermoplastic composition according to Aspect 17 or 18, wherein the PCR polycarbonate is recycled from one or more of a water bottle, an optical disc, a car headlight or a sheet film.

Aspect 20. The thermoplastic composition according to any of Aspects 17 to 19, wherein the composition further comprises from greater than 0 wt % to about 90 wt % of a non-recycled polycarbonate component.

Aspect 21. The thermoplastic composition according to Aspect 20, wherein the non-recycled polycarbonate component comprises virgin polycarbonate, a polycarbonate homopolymer, a polycarbonate copolymer, or a combination thereof.

Aspect 22. The thermoplastic composition according to any of Aspects 17 to 21, wherein the composition further comprises a polycarbonate-siloxane copolymer.

Aspect 23. The thermoplastic composition according to Aspect 22, wherein the polycarbonate-siloxane copolymer has a siloxane content of from about 15 wt % to about 25 wt %.

Aspect 24. The thermoplastic composition according to any of Aspects 17 to 23, wherein the acid component comprises mono zinc phosphate (MZP), a liquid solution comprising phosphorous acid, or a combination thereof.

Aspect 25. The thermoplastic composition according to any of Aspects 17 to 24, wherein the composition further comprises from greater than 0 wt % to about 5 wt % of an epoxy stabilizer.

Aspect 26. The thermoplastic composition according to any of Aspects 17 to 25, wherein the composition further comprises from greater than 0 wt % to about 5 wt % of at least one additional stabilizer.

Aspect 27. The thermoplastic composition according to Aspect 26, wherein the at least one additional stabilizer comprises a UV stabilizer or a thermal stabilizer.

Aspect 28. The thermoplastic composition according to any of Aspects 17 to 27, wherein the composition comprises mono zinc phosphate and an epoxy stabilizer.

Aspect 29. The thermoplastic composition according to any of Aspects 17 to 28, wherein the composition has improved hydro-aging stability after exposure for 3 days at 85° C. and 85% relative humidity (RH) as compared to a comparative composition that does not comprise the acid component.

Aspect 30. The thermoplastic composition according to any of Aspects 17 to 29, wherein the composition comprises mono zinc phosphate and an epoxy stabilizer and has an improved L* color value, as tested in accordance with ASTM 2244 with a 10 degree (°) observer and a D65 illuminant, as compared to a comparative composition that does not comprise the epoxy stabilizer.

Aspect 31. The thermoplastic composition according to any of Aspects 17 to 30, wherein the composition comprises mono zinc phosphate and an epoxy stabilizer and: (1) has an improved transmittance, as tested in accordance with ASTM D1003, as compared to a comparative composition that does not comprise the epoxy stabilizer; or (2) has a reduced yellowness index, as tested in accordance with ASTM D2244, as compared to a comparative composition that does not comprise the epoxy stabilizer.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The materials used in the comparative and example compositions described herein are listed in Table 1:

TABLE 1

| Materials | | |
|---|---|---|
| Item Description | Chemical Description | Source |
| C023A Polycarbonate (virgin) | PC | SABIC |
| MZP | Stabilizer | Budenheim |
| Phosphorous acid, 45% | Stabilizer | Sinopharm Chemical |
| Joncryl ADR 4368CS | Stabilizer (epoxy) | BASF |
| Recycled PC (from car lamp/sheet/CD) | PCR-PC | Hongyu |
| PC-Si copolymer (20% siloxane content) (EXL) | PC-Si Copolymer | SABIC |

Pellets were compounded from the compositions according to conventional processes. The PCR-PC was fed into the throat separately from the other components. The compositions were compounded using an output of 40 kilograms per hour (kg/hr), a screw speed of 400 revolutions per minute (RPM), a vacuum of 0.08 megapascals (MPa), a barrel temperature of from 260-270° C. and a die head temperature of 270° C.

The pellets were injected molded according to the conditions set forth in Table 2:

TABLE 2

| Injection Molding Parameters | | |
|---|---|---|
| Molding parameters | Unit | Value |
| Pre-drying time | hr | 3 |
| Pre-drying temp | ° C. | 120 |
| Hopper temp | ° C. | 50 |
| Zone 1 temp | ° C. | 280 |
| Zone 2 temp | ° C. | 285 |
| Zone 3 temp | ° C. | 285 |
| Nozzle temp | ° C. | 275 |
| Mold temp | ° C. | 75 |

Tensile strength was measured according to ASTM D638, at a test speed of 5 millimeter per minute (mm/min). Impact tests were performed according to ASTM D256 and ASTM D4812 at room temperature and with a pendulum energy of 5 pound-force per foot (lbf/ft). Flexural properties were tested according to ASTM 790, at a test speed of 1.27 mm/min and with a part thickness of 3.2 mm. Melt Volume Rate (MVR) was measured using granulate samples dried for 4 hours (hrs) at 80° C., according to ASTM D1238. Color (L*, a*, b*) was measured using method ASTM 2244 with 10° observer and D65 illuminant.

Figure 2A:
FIGS. 2A-2E are photographs showing reference plaques for use in quantifying the hydro-aging stability of comparative and example compositions according to aspects of the disclosure.
Figure 2B:
Figure 2C:
Figure 2D:
Figure 2E:

Hydro-aging performance was visually observed by the naked eye. Performance was assessed qualitatively by visually observing aged injection-molded plaques and applying a ranking of 1-5 based on reference aged plaques; the reference aged plaques are illustrated in FIG. 2A (Rank 1), FIG. 2B (Rank 2), FIG. 2C (Rank 3), FIG. 2D (Rank 4) and FIG. 2E (Rank 5). Before visual inspection, injection molded plaques were placed in a hydro-aging oven for 72 hours at 85 degrees Celsius (° C.) and a humidity of 85% relative humidity (RH). The hydro-aging performance of the aged plaques was evaluated by having 3 to 5 operators applying the rating scale to each sample, with Rank 1 indicating the poorest hydro-stability (more aging spots) and Rank 5 indicating the best hydro-stability (less aging spots). The ratings for all samples of each composition were then averaged to obtain the average hydro-aging rank.

Table 3 lists comparative and example compositions formed. All values in Table 3 and the other tables describing the compositions formed are provided in weight % (wt %):

TABLE 3

| Comparative and Example Compositions | | | | | | | |
|---|---|---|---|---|---|---|---|
| Component | C1 | Ex1 | Ex2 | C3 | Ex3 | Ex4 | C2 |
| PCR-PC | 90 | 89.9 | 89.7 | 89.5 | 89.4 | 89.2 | 89.9 |
| PC (virgin) | 10 | 10 | 10 | 10 | 10 | 10 | 10 |
| MZP | | 0.1 | 0.3 | | 0.1 | 0.3 | |
| Joncryl ADR (epoxy) | | | | 0.5 | 0.5 | 0.5 | |
| DHT-4T, hydrotalcite | | | | | | | 0.1 |

Composition C1 is a control composition which includes 90% PCR-PC. Ex1 and Ex2 include MZP, which is a weak acid, as a stabilizer. C3 includes an epoxy as a chain extender. Ex3 and Ex4 combine both the stabilizer (acid component) and epoxy. C2 is a control composition including hydrotalcite, which is week basic component.

Color performance of the compositions is provided in Table 4:

TABLE 4

| Properties of Table 3 Compositions | | | | | | | | |
|---|---|---|---|---|---|---|---|---|
| Property | Unit | C1 | Ex1 | Ex2 | C3 | Ex3 | Ex4 | C2 |
| Hydro-aging performance | Rank | 2 | 3.5 | 3 | 2.5 | 4 | 3.5 | 1.8 |
| MFR, 300° C., 1.2 kg, 360 s | $cm^3$/min | 14 | 17 | 32 | 19 | 21 | 25 | 16 |
| Color, 3 mm | — | | | | | | | |
| L* | — | 90.7 | 88.1 | 76.8 | 92 | 91.4 | 84.2 | 91.6 |
| a* | — | −0.5 | 0.4 | 2.5 | −0.7 | −0.7 | 0.3 | −0.7 |
| b* | — | 2.8 | 7.6 | 16 | 2.4 | 4.2 | 15 | 3.2 |
| Transmittance | % | 80.4 | 73.7 | 50.1 | 83 | 82 | 66 | 82 |
| Yellowness Index, YI | — | 5.3 | 15.3 | 35.8 | 4.2 | 7.5 | 29.7 | 5.6 |

Comparing C1, C2, Ex1 and Ex2 it was observed that by adding an acid component (e.g., MZP), rather than hydrotalcite, the hydro-aging performance was highly improved. These results indicate that the post-consumer recycled components are more sensitive to the basic additive and induce hydro-aging spots. Maintaining the formulation weakly acidic highly improved this issue. However, introduction of the acid, especially at a high loading (e.g., Ex2 having 0.3 wt % MZP) introduced a yellowness issue to the samples, which is unacceptable for applications requiring light color or transparent color. This is observed in the YI values in Table 3.

Potential solutions to address the yellowness issue were considered. First, epoxy was added. Comparing compositions C1 and C3, L* increased from 91 to 92, transmittance increased from 80% to 83%, and YI decreased from 5.3 to 4.2. Comparing Ex1 and Ex3, addition of epoxy improved L* (88 to 91), transmittance (74% to 82%) and YI (decrease from 15.3 to 7.5). Further, even with a high MZP loading (Ex4), the inclusion of epoxy helped to improve L* and transmittance and decrease YI. And significantly, the inclusion of epoxy also improved the issue of hydro-aging spots.

Further comparative and example compositions were formed according to Table 5:

TABLE 5

| Comparative and Example Compositions | | | | | |
|---|---|---|---|---|---|
| Component | C4 | Ex5 | Ex6 | Ex7 | Ex8 |
| PCR-PC | 90 | 89.95 | 89.9 | 89.95 | 89.9 |
| PC (virgin) | 10 | 10 | 10 | 10 | 10 |
| MZP | | 0.05 | 0.1 | | |
| Phosphorous acid, 45% | | | | 0.05 | 0.1 |

Properties of these compositions are provided in Table 6:

TABLE 6

| Properties of Table 5 Compositions | | | | | | |
|---|---|---|---|---|---|---|
| Property | Unit | C4 | Ex5 | Ex6 | Ex7 | Ex8 |
| Hydro-aging performance | Rank | 3 | 4 | 4 | 3.5 | 4 |
| MFR, 300° C., 1.2 kg, 360 s | $cm^3$/min | 15.0 | 16.8 | 18.8 | 15.0 | 14.6 |
| MFR, 300° C., 1.2 kg, 1080 s | $cm^3$/min | 17.0 | 19.0 | 22.4 | 15.5 | 14.8 |
| MFR shift | % | 13 | 13 | 19 | 3 | 2 |
| NII, 23° C., normal | J/m | 825 | 534 | 671 | 662 | 635 |
| NII, 23° C., aged 3 days | J/m | 81.5 | 75.8 | 71.9 | 83.7 | 78.5 |
| Color, 3.0 mm, normal | | | | | | |
| L* | — | 93 | 90.6 | 86.4 | 92.6 | 93 |
| a* | — | 2.2 | 5.4 | 9.1 | 2.4 | 2.1 |
| b* | — | −0.5 | 0.1 | 0.8 | −0.5 | −0.5 |
| Color, 3.0 mm, aged 3 days | | | | | | |
| L* | — | 93 | 90.2 | 86.2 | 92.7 | 92.9 |
| a* | — | −0.6 | 0 | 0.7 | −0.6 | −0.6 |
| b* | — | 2.2 | 6.5 | 10.2 | 2.6 | 2.3 |
| YI | | 3.81 | 10.7 | 18.81 | 4.24 | 3.67 |
| Haze | | 3.8 | 7.4 | 12.9 | 4.5 | 3.9 |
| T % | % | 85.1 | 80 | 71.4 | 84.3 | 85 |

It is noted that compositions C4 and Ex6 have the same composition as C1 and Ex1, respectively. The different hydro-aging rank values can be attributed to different lots of PCR-PC, as there can be a variance in quality from lot-to-lot. A phosphorous acid liquid solution was investigated as an alternative to MZP (which is solid) in Ex7 and Ex8. The phosphorus acid liquid solution improved not only color (yellowness issue) but also physical performance. Comparing Ex5 and Ex6 (which include MZP) with Ex7 and Ex8 (including phosphorous acid liquid solution), the color performance of Ex7 and Ex8 was improved with higher L*, transmittance, lower b*, lower YI, and lower haze—which was comparable to control composition C4. Color after hydro-aging also showed a similar performance. In addition, as observed from the MFR shift data, the liquid phosphorous acid helped to improve the thermal stability of the PCR compounds. Finally, as shown in the hydro-aging rankings, the use of liquid phosphorous acid can—like MZP—improve the issue of hydro-aging spots (compare Ex7 and Ex8 to C4).

Based on this data, it is seen that hydro-aging performance PCR-based components can be improved by either combining a solid acid component (e.g., MZP) with an epoxy or by using a liquid acid component.

Further compositions have been prepared to evaluate the effect of including a PC-siloxane copolymer (e.g., EXL from SABIC) on the compositions. The compositions are shown in Table 7:

TABLE 7

| PC-Si Copolymer Compositions | | | | |
|---|---|---|---|---|
| Component | Unit | C5 | Ex9 | Ex10 |
| PC-Si Copolymer | % | 50 | 50 | 50 |
| PC | % | 9.65 | 9.65 | 9.65 |
| PCR-PC | % | 40 | 40 | 40 |
| CYASORB ® UV5411 (Solvay) | % | 0.3 | 0.3 | 0.3 |
| AO 168, antioxidant | % | 0.05 | 0.05 | 0.05 |
| $H_3PO_3$ | % | | 0.1 | 0.1 |
| Joncryl epoxy | % | | | 0.5 |

Evaluation of the properties of the Table 7 compositions is ongoing. It is believed that the example compositions Ex9 and Ex10 will have even further improved hydro-aging stability properties.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A thermoplastic composition comprising:

(a) about 89 wt % at least one recycled polycarbonate comprising a post-consumer recycled (PCR) polycarbonate comprising at least 10 mol % —OH end group content;

(b) about 10 wt % of a virgin polycarbonate;

(c) from about 0.1 wt % to about 0.3 wt % mono zinc phosphate; and (d) about 0.5 wt % of a polymeric epoxy chain extender, wherein the composition has improved hydro-aging stability after exposure for 3 days at 85° C. and 85% relative humidity (RH) as compared to a comparative composition that does not comprise the mono zinc phosphate, or has an improved L* color value, as tested in accordance with ASTM 2244 with a 10 degree (°) observer and a D65 illuminant, as compared to a comparative composition that does not comprise the polymeric epoxy chain extender, and wherein the combined weight percent value of all components does not exceed 100 wt %, and all weight percent values are based on the total weight of the composition.

2. The thermoplastic composition according to claim 1, wherein the PCR polycarbonate comprises from 10 mol % to 35 mol % —OH end group content.

3. The thermoplastic composition according to claim 1, wherein the PCR polycarbonate is recycled from one or more of a water bottle, an optical disc, a car headlight or a sheet film.

4. The thermoplastic composition according to claim 1, wherein the virgin polycarbonate, comprises a polycarbonate homopolymer, a polycarbonate copolymer, or a combination thereof.

5. The thermoplastic composition according to claim 1, wherein the composition further comprises a polycarbonate-siloxane copolymer.

6. The thermoplastic composition according to claim 5, wherein the polycarbonate-siloxane copolymer has a siloxane content of from about 15 wt % to about 25 wt %.

7. The thermoplastic composition according to claim 1, wherein the composition further comprises at least one additional stabilizer.

8. The thermoplastic composition according to claim 7, wherein the at least one additional stabilizer comprises a UV stabilizer or a thermal stabilizer.

9. The thermoplastic composition according to claim 1, wherein the composition: (1) has an improved transmittance, as tested in accordance with ASTM D1003, as compared to a comparative composition that does not comprise the polymeric epoxy chain extender; or (2) has a reduced yellowness index, as tested in accordance with ASTM D2244, as compared to a comparative composition that does not comprise the polymeric epoxy chain extender.

10. The thermoplastic composition according to claim 1, wherein the polymeric epoxy chain extender has an epoxy equivalent weight of about 285 grams per mole.

11. The thermoplastic composition according to claim 1, wherein the polymeric epoxy chain extender comprises the product ADR 4368 sold under the trademark Joncryl®.

* * * * *